J. H. HUNT.
ENGINE STARTING SYSTEM.
APPLICATION FILED JULY 3, 1914.

1,259,744.

Patented Mar. 19, 1918.
2 SHEETS—SHEET 1.

Witnesses:
Walter H Riedel
Joseph N. McDonald

Inventor
John H. Hunt.
By Attorneys
Ken Page, Cooper & Hayward

J. H. HUNT.
ENGINE STARTING SYSTEM.
APPLICATION FILED JULY 3, 1914.
1,259,744.
Patented Mar. 19, 1918.
2 SHEETS—SHEET 2.
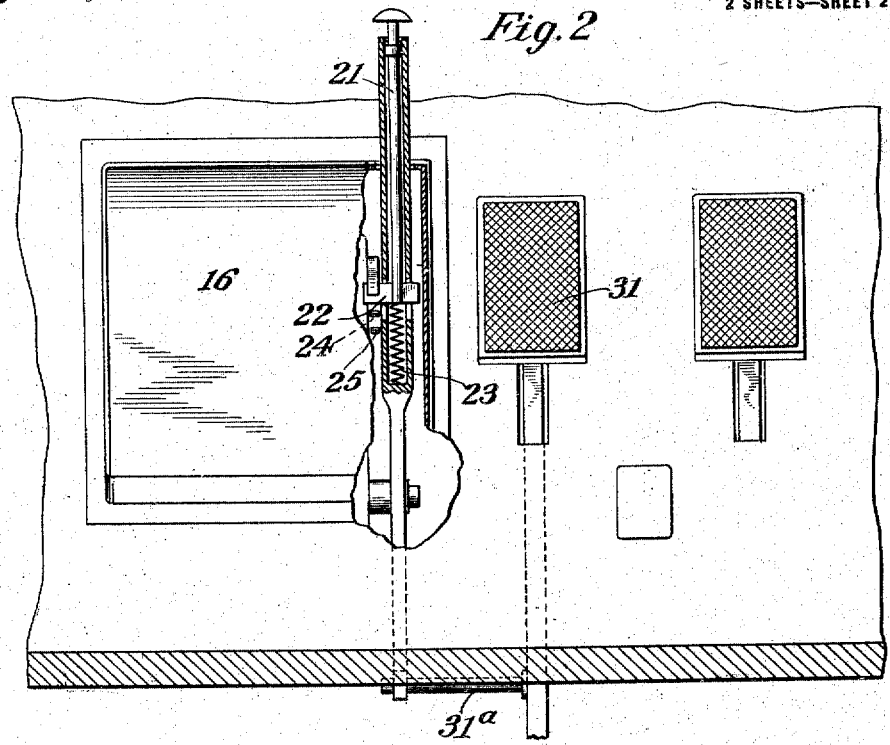
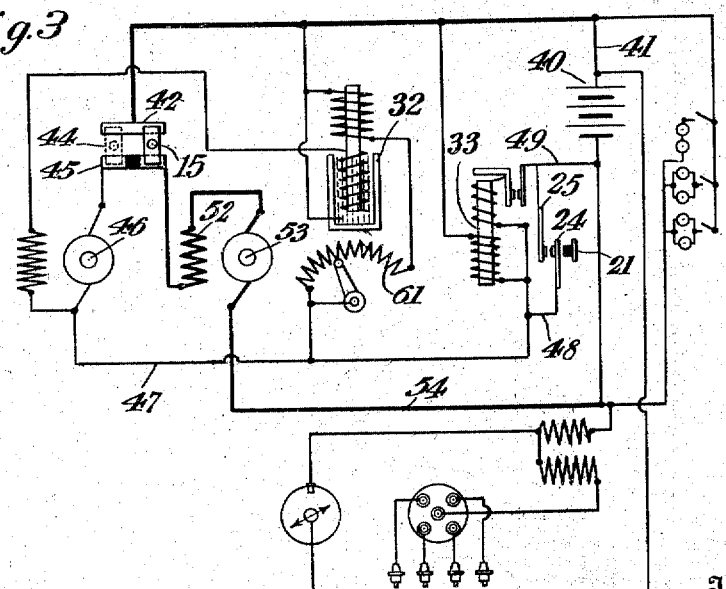

UNITED STATES PATENT OFFICE.

JOHN H. HUNT, OF DAYTON, OHIO, ASSIGNOR TO THE DAYTON ENGINEERING LABORATORIES COMPANY, A CORPORATION OF OHIO.

ENGINE-STARTING SYSTEM.

1,259,744.   Specification of Letters Patent.   Patented Mar. 19, 1918.

Application filed July 3, 1914. Serial No. 848,902.

*To all whom it may concern:*

Be it known that I, JOHN H. HUNT, a citizen of the United States of America, residing at Dayton, county of Montgomery, and State of Ohio, have invented certain new and useful Improvements in Engine-Starting Systems, of which the following is a full, clear, and exact description.

This invention relates to improvements in starting systems for engines, and more particularly to improvements in starting systems for the internal combustion engines of automobiles or motor road vehicles.

One object of the invention is to improve upon the method of mounting this starting device relative to the engine. A further object is to simplify the control of the starting device and at the same time to insure that it shall not be accidentally operated.

In accordance with one feature of this invention the starting device is mounted upon the automobile in such a position that it does not interfere with the engine arrangements and is at the same time accessible for repairs, adjustment or lubrication. I may locate the starting device above the flywheel of the engine and so arrange that the starting device shall be connected with the engine by gearing which meshes into teeth formed on the engine flywheel. I preferably locate the starting device above the flywheel in such manner that its length extends toward the rear wheels of the vehicle, that is away from the rear cylinder of the engine.

In most motor road vehicles the engine flywheel and clutch associated therewith are located below and in proximity to the flooring of the driver's seat, and when the starting device is arranged in the position hereinbefore referred to, it will be either beneath the aforesaid flooring, or partly beneath said flooring and partly projecting through it. When the starting device projects through the flooring I may cover the projecting portion thereof by means of a casing or the like, and I may provide a door to said casing, or otherwise arrange for access to the starting device through said casing.

A preferred form of my invention will now be described with reference to the accompanying drawings, in which:—

Fig. 2 is a view looking toward the plane of the sloping floor board of an automobile equipped with the invention, parts being shown in section, and Fig. 3 is a diagram of the electrical connections.

Figure 1:
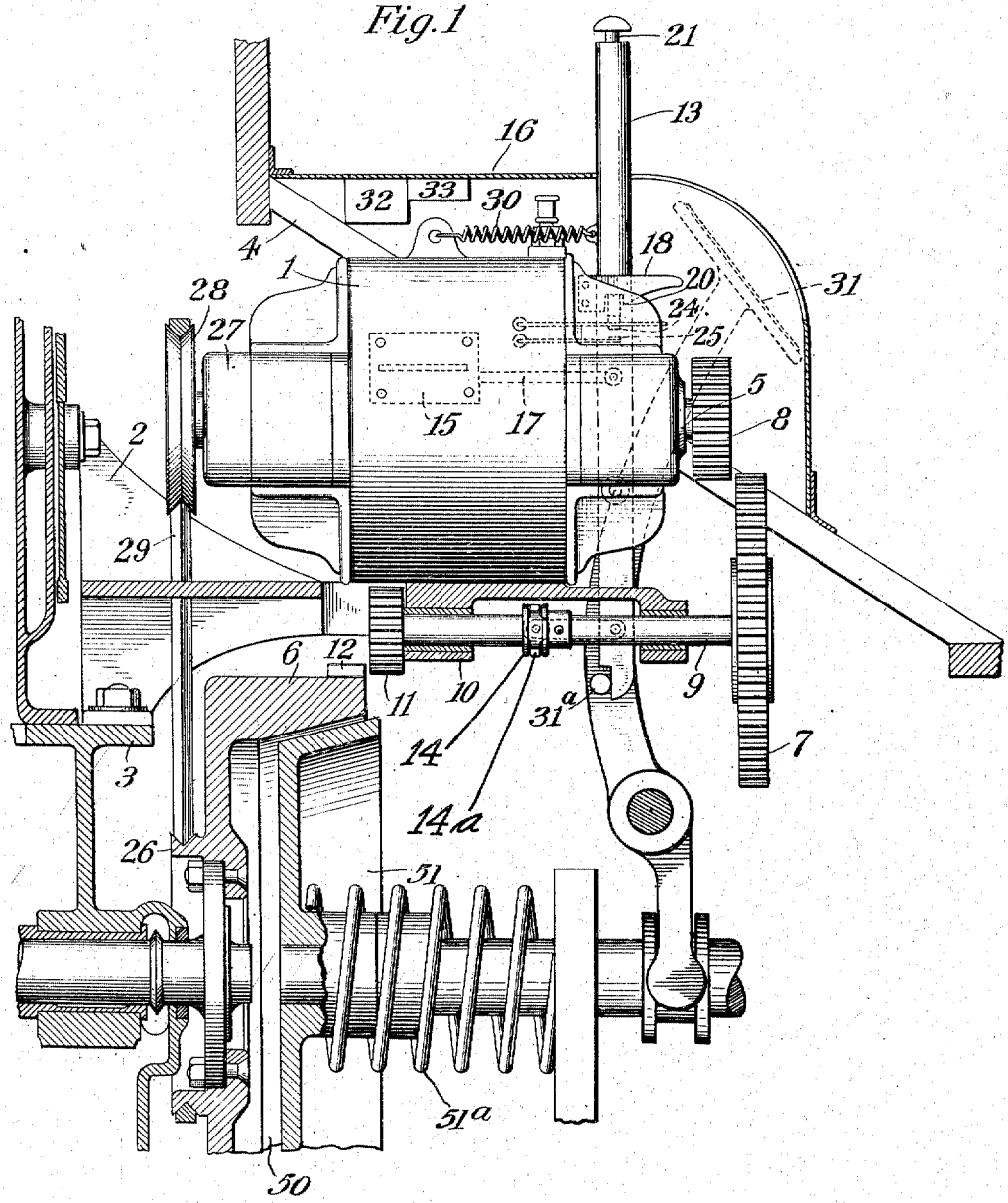
Figure 1 is a part sectional, part end elevation.

Referring to Fig. 1, the numeral 1 represents a motor-generator or electric machine of the kind described in the co-pending application of Charles F. Kettering, Serial No. 633,443, filed June 15, 1911; Serial No. 621,512, filed April 17, 1911; and Serial No. 721,237, filed September 19, 1912, which machine is mounted on a bracket 2 supported in suitable manner upon the engine casing 3, said bracket serving to support the starting device in position above the flywheel and below the flooring 4. The armature shaft 5 of the electric machine is connected with the engine flywheel 6 through a train of speed reducing gearing consisting of a pinion 7, adapted for enmeshment with a pinion 8 on the armature shaft 5, and which is mounted on a shiftable intermediate shaft 9, located below the starting device and capable of sliding in bearings 10 carried by the bracket 2, the end of said shaft near the engine flywheel being provided with a pinion 11 adapted for enmeshment with the teeth 12 on the flywheel. On shifting the shaft 9 the pinion 7 comes into mesh with the armature pinion 8, while the pinion 11 meshes with the teeth 12 on the flywheel. Suitable provisions may be made for shifting said gearing as for example a lever device controlled by a pedal or hand lever 13. I preferably provide a collar 14 on the aforesaid shaft 9 which is engaged by a shifting fork 14ᵃ connected with the aforesaid lever 13, the upper end of which lever constitutes the operating handle. It will be seen that the actuation of this lever by its handle causes the aforesaid shifting movement of the intermediate shaft 9 and the consequent connection of the starting device with the engine flywheel.

I may so arrange that the starting or controlling lever 13 also controls the electrical connections of the system, and preferably so that actuation thereof will change the electrical connections from charging conditions to starting conditions and vice versa. As shown, I mount a selective switch 15 which controls the relation between the windings of the machine and the battery, within the casing 16 which incloses the machine; and I provide a lever 17 connecting said switch with the starting lever 13, so that said switch will be actuated when the starting lever is actuated.

In order to prevent the accidental operation of the starting device owing to inadvertant actuation of the starting lever, I provide the starting lever with a locking device which must be released by the operator before said lever can be actuated. 18 is a stationary locking member mounted on the starting device and formed with a locking notch 20. The starting lever is hollow, and a rod 21 (Fig. 2) is arranged in the bore thereof and provided with a locking projection 22 which is adapted to be engaged under spring pressure with the aforesaid notch 20 to lock the lever in its normal position. In order to start the engine, the operator presses the upper end of the rod 21 against the action of its spring 23, thereby depressing said rod and releasing the locking projection 22 from the notch. The operator is then able to shift the starting lever from neutral position to starting position.

It is desirable that the starting device shall operate with initial movement before it is coupled with the engine to facilitate the enmeshment of the toothed pinions, and various methods of accomplishing this are described in the aforesaid co-pending applications of Charles F. Kettering, Serial No. 633,443, filed June 15, 1911, and Serial No. 721,237, filed September 19, 1912. When the initial movement of the starting device is produced by closing an auxiliary circuit, I so arrange that the operation of an auxiliary member or the like to release the starting lever from locked position, will also close said circuit. Upon depression of the rod 21 to release the projection 22 from the locking notch 20, the end of said rod 21 comes against a spring contact arm 24 and presses it against a stationary contact 25, thereby simultaneously closing said auxiliary circuit and releasing the starting lever from its locking mechanism. When the starting device is thus caused to rotate slowly, the starting lever is thrown over to starting position, as described above; the starting device is connected with the engine, and the selective switch 15 is simultaneously actuated to shift the electrical connections so that the machine will operate as a motor with high torque effect when it is coupled with the engine.

In order to drive the dynamo electric machine as a generator at a relatively low speed, a second connection is provided between it and the engine, and this may consist of a chain or belt connection, or toothed gearing. As shown I provide a belt pulley 26 on the engine shaft, integral with the flywheel. The free end of the armature shaft of the dynamo electric machine is provided with a roller clutch 27 which permits the armature of the electric machine to operate independently of the pulley 28, at such times as the speed of the electric machine, operating as a motor, is greater than the speed of the engine. That is, this clutch is of the well known cam and roller type. In view of the fact that this type of clutch is well known, a detailed description and illustration of the same is not deemed necessary in the present application. The armature shaft is connected through said clutch with a belt pulley 28 connected by a belt 29 with the aforesaid belt pulley 26 on the flywheel. After the engine has been started by the actuation of the starting lever, the lever is returned to normal position by means of a spring 30, and the starting device is disconnected from the engine flywheel, owing to the withdrawal of the pinion 11 which engages with said flywheel. The machine is then driven as a low speed generator through the aforesaid belt connection.

In some cases I find it more convenient to locate the pinion end of the generator and the speed reducing gearing toward the rear cylinder, in which case the aforesaid second transmission is not connected to the engine shaft, but to the transmission shaft between the engine clutch and the change speed gearing of the vehicle, or to some other suitably driven shafting. In this way I am able to, in certain circumstances, economize the space occupied by the starting device.

I may, if desired, provide a mechanical interlock between the clutch pedal 31 and the aforesaid starting lever or starting pedal, such that the starting lever cannot be actuated unless the clutch is thrown out by depression of the clutch pedal, as shown in Fig. 2. I prefer to provide the clutch pedal 31 with a transverse portion 31$^a$ projecting into the path of the starting lever 13, so that said lever cannot be shifted until the pedal has been depressed and the aforesaid portion 31$^a$ withdrawn from the path of the starting lever.

The engine clutch, which is of the usual type, is disclosed in Fig. 1 and is normally maintained in engaging position by means of the spring 51$^a$. This clutch is of the same type as that referred to in the co-pending applications heretofore referred to.

Within the aforesaid casing 16 containing the starting device, I may also locate other devices incident to an engine starting system, as for instance, the voltage regulator 32 for controlling the charging of the battery, and the cut out relay 33 for disconnecting the battery under well known conditions. In this way all the important elements of the system may be grouped together in an accessible position instead of being scattered over the car.

By referring to the wiring diagram shown in Fig. 3, it will be noted that when the operator desires to start the engine, his first operation is to depress the button 21, thereby closing contacts 24 and 25. This permits a flow of current to pass from the battery 40, through wire 41 to the common contact element 42 of the switch 15.

The movable element 44 of the switch 15 is normally in the position shown in dotted lines in the diagrammatic view in Fig. 3. The current passes across this movable element 44, to the stationary plate 45, thence across the generator armature 46 to the opposite line wire 47, back to the battery, via the conductor 48, contact plates 24 and 25 and wire 49.

The effect of this operation is to actuate the electric machine as a motor, but with a reduced torque and speed effect, as compared with the operation of the machine as a motor for starting purposes.

This slow initial movement of the electric machine tends to facilitate the coupling up of the shiftable gearing which includes the pinions 7 and 11, with the armature pinion 8 and the flywheel gear teeth 12 respectively.

The operator next depresses the pedal 31, which will tend to throw out the movable portion 51 of the engine clutch 50 and to also throw the lug 31ᵃ out of the path of travel of the lever 13. A further movement of the lever 13 will also actuate the movable element 44 of the switch 15 and throw the same into full line position shown in Fig. 3. This will break the initial motor circuit and tend to close a circuit from the battery 40, through line wire 41, contact plate 42, the movable switch element 44, through the motor field winding 52, across the armature 53, back to the battery, via the line conductor 54.

These circuit connections will permit the electric machine to operate as a motor, and will effect a starting or cranking operation of the engine.

Now, as soon as the engine becomes self-actuating, the operator releases the lever 13, thereby returning the shiftable gearing which includes pinions 7 and 11, to normal position shown in Fig. 1. This operation of the lever 13 will return the switch element 44 to the dotted line position shown in Fig. 3, and inasmuch as the operator has already released the button 21, the electric machine and the battery will be disconnected.

However, as soon as the engine becomes self-actuating, it will tend to drive the electric machine as a generator through the belt connection 29 and the clutch 27.

The electric machine is then operating as a generator, and tends to charge current back into the battery through the following circuit connections: from the armature 46, through the contacts 45 and 44 and 42 of the switch 15, line wire 41, through the battery 40, across wire 49 through the relay device 33, thence back to the opposite side of the generator, via the conductor 47.

This generator is of the shunt wound type and therefore a circuit will be set up through the shunt field winding 60, through the regulator 32 and the rheostat unit 61.

In view of the fact that the electrical arrangements, *per se*, do not form a part of the present invention, further description thereof is deemed unnecessary.

While the form of mechanism herein shown and described constitutes a preferred form of embodiment of the invention, it is to be understood that other forms might be adopted, all coming within the scope of the claims which follow.

What I claim is:

1. In an engine starting system, the combination with an engine having a friction clutch; means for normally maintaining said clutch in driving position; a clutch controlling member operable to disengage said clutch from driving position; a starting device for said engine; a controlling lever for said starting device: and a mechanical interlock between the controlling lever of the starting device and the clutch controlling member, so that the operation of the controlling lever for the starting device will be prevented, except at such times as the clutch controlling member is shifted to disengage the clutch from driving position.

2. In an engine starting device, the combination with an engine and a starting device therefor; of a controlling member for said starting device, a lever associated with said controlling member; means normally engaging said lever to latch the controlling member in normal position; and means operable by said lever when operated to unlatch the controlling member to effect an initial operation of the starting device.

3. In an engine starting system, the combination with an engine, and a starting device therefor; shiftable elements for connecting the starting device and engine together for starting purposes; a control lever for shifting said shiftable elements; means for imparting an initial operation to the starting device to facilitate the shifting of said elements; and means for locking the said control lever in inoperative position, except when the means for imparting the initial movement of the starting device is operated.

4. In an engine starting device, the combination with an engine, including a clutch controlling member; of a starting device for said engine, including an electric motor having circuit connections; means for coupling the electric motor and engine together for starting purposes; and a starting lever normally locked in inoperative position by means of the clutch controlling member, said starting lever being operable to make the motor circuit connections and to shift the means for connecting up the engine and motor together, when the clutch controlling element has been shifted into position to throw out the engine clutch.

5. In a starting system for engines, the combination with an engine, including a clutch controlling member; of a starting device, including an electric motor having circuit connections; switches for making and breaking said motor circuits; latching means for preventing the operation of one of said switches previous to the operation of another of said switches; and a mechanical interlock associated with the clutch controlling member for preventing the operation of one of said switches until the clutch controlling member has been actuated to throw out the engine clutch.

In testimony whereof I affix my signature in the presence of two subscribing witnesses.

JOHN H. HUNT.

Witnesses:
 OTTIS D. W. FOWRY,
 J. W. MCDONALD.

Copies of this patent may be obtained for five cents each, by addressing the "Commissioner of Patents, Washington, D. C."